(12) United States Patent
Dickson et al.

(10) Patent No.: US 8,333,269 B2
(45) Date of Patent: Dec. 18, 2012

(54) INSULATOR FOR A WHEEL SUSPENSION SYSTEM

(75) Inventors: Daniel G. Dickson, West Bloomfield, MI (US); Anand Huprikar, Novi, MI (US)

(73) Assignee: BASF Corporation, Florham Park, NJ (US)

( * ) Notice: Subject to any disclaimer, the term of this patent is extended or adjusted under 35 U.S.C. 154(b) by 1552 days.

(21) Appl. No.: 11/779,076

(22) Filed: Jul. 17, 2007

(65) Prior Publication Data
US 2008/0012263 A1    Jan. 17, 2008

Related U.S. Application Data

(60) Provisional application No. 60/807,518, filed on Jul. 17, 2006, provisional application No. 60/824,976, filed on Sep. 8, 2006.

(51) Int. Cl.
*F16F 9/00* (2006.01)
(52) U.S. Cl. .................. 188/321.11; 267/220; 267/292; 267/293; 267/294
(58) Field of Classification Search .................. 267/220, 267/292, 293, 294; 188/321.11
See application file for complete search history.

(56) References Cited

U.S. PATENT DOCUMENTS

| | | | |
|---|---|---|---|
| 2,037,033 A * | 4/1936 | Lord | 267/141.6 |
| 2,981,534 A * | 4/1961 | Peras | 267/220 |
| 3,012,283 A | 12/1961 | Foster | |
| 3,082,998 A | 3/1963 | Lange | |
| 3,455,546 A | 7/1969 | Shanok et al. | |
| 3,950,483 A | 4/1976 | Spier | |
| 4,080,416 A | 3/1978 | Howard | |
| 4,260,575 A | 4/1981 | Thew et al. | |
| 4,447,486 A | 5/1984 | Hoppe et al. | |
| 4,508,774 A | 4/1985 | Grabhoefer et al. | |
| 4,568,067 A | 2/1986 | Iwata | |
| 4,711,463 A | 12/1987 | Knable et al. | |

(Continued)

FOREIGN PATENT DOCUMENTS

EP    0778166 B1    11/2001

(Continued)

OTHER PUBLICATIONS

English language abstract for JP 61085430 extracted from espacenet.com database, dated Oct. 26, 2010, 7 pages.

(Continued)

*Primary Examiner* — Bradley King
*Assistant Examiner* — Mahbubur Rashid
(74) *Attorney, Agent, or Firm* — Howard & Howard Attorneys PLLC

(57) ABSTRACT

An insulator for a wheel suspension system of a vehicle is formed of an elastomeric material. The elastomeric material defines a channel that provides increased flexibility to the insulator and defines an increased density about the channel that increases the durability of the insulator. The suspension system includes a support structure adapted to be mounted to the vehicle, a piston rod disposed within the aperture and displaceable relative to the support structure along a line of travel, and a plate mounted to the piston rod. The insulator is compressibly disposed between the support structure and the plate. The exterior channel increases the flexibility of the insulator to distribute localized stress on the insulator by the support structure and the plate. The increased density about the channel increases the durability of the insulator about the channel when the support structure and the plate exert a compressive force on the insulator.

36 Claims, 4 Drawing Sheets

U.S. PATENT DOCUMENTS

| | | | |
|---|---|---|---|
| 4,741,951 A | 5/1988 | Ricciardi et al. |
| 4,756,516 A | 7/1988 | Tondato |
| 4,805,886 A | 2/1989 | Hassan |
| 5,010,133 A | 4/1991 | Seville |
| 5,052,665 A | 10/1991 | Sakuragi |
| 5,308,104 A | 5/1994 | Charles |
| 5,419,539 A | 5/1995 | Bressler |
| 5,421,565 A | 6/1995 | Harkrader et al. |
| 5,467,970 A | 11/1995 | Ratu et al. |
| 5,467,971 A | 11/1995 | Hurtubise et al. |
| 5,470,049 A | 11/1995 | Woehler et al. |
| 6,079,700 A | 6/2000 | Solomond et al. |
| 6,158,726 A | 12/2000 | Coleman et al. |
| 6,296,237 B1 | 10/2001 | Nagai |
| 6,352,250 B1 | 3/2002 | Tsuruta et al. |
| 6,368,702 B1 | 4/2002 | Erickson |
| 6,457,704 B1 | 10/2002 | Van Eerden et al. |
| 6,517,501 B1 | 2/2003 | Slautterback |
| 6,540,216 B2 | 4/2003 | Tousi et al. |
| 6,592,112 B2 | 7/2003 | Bishop et al. |
| 6,857,626 B2 | 2/2005 | Burlage et al. |
| 6,872,758 B2 | 3/2005 | Simpson et al. |
| 7,040,608 B2 | 5/2006 | Schafer |
| 2002/0063369 A1 | 5/2002 | Huang |
| 2003/0222386 A1 | 12/2003 | Duerre et al. |
| 2004/0075204 A1 | 4/2004 | Heidemann et al. |
| 2004/0094880 A1 | 5/2004 | Lee |
| 2005/0012256 A1 | 1/2005 | Huprikar et al. |
| 2006/0001205 A1 | 1/2006 | Raza |
| 2008/0012178 A1 | 1/2008 | Dickson |
| 2008/0012188 A1 | 1/2008 | Dickson |

FOREIGN PATENT DOCUMENTS

| | | |
|---|---|---|
| GB | 1132954 | 11/1968 |
| JP | 61085430 A | 5/1986 |
| JP | 06189392 A | 7/1994 |
| JP | 2001036997 A | 2/2001 |
| WO | WO 8805801 | 8/1988 |

OTHER PUBLICATIONS

U.S. Appl. No. 11/457,882, filed Jul. 17, 2006, Dickson, 25 pages.
U.S. Appl. No. 11/457,835, filed Jul. 17, 2006, Dickson et al., 22 pages.

\* cited by examiner

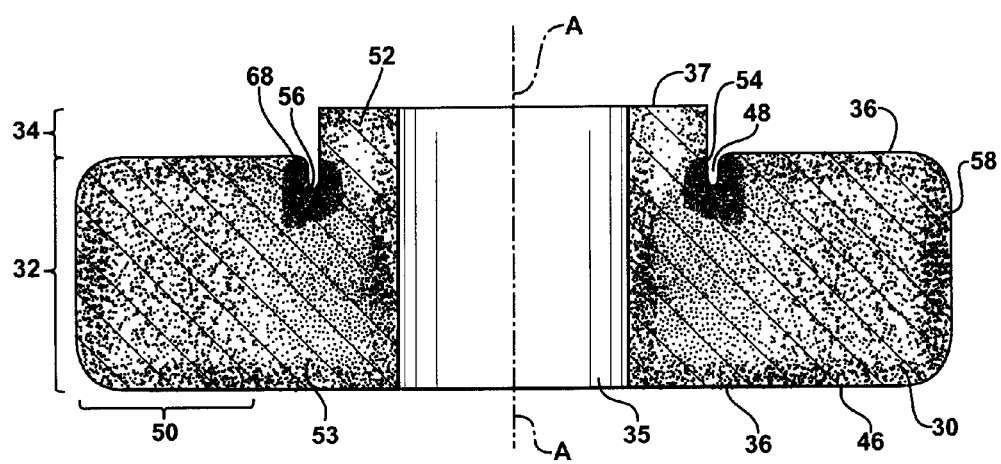
FIG - 4
FIG - 6
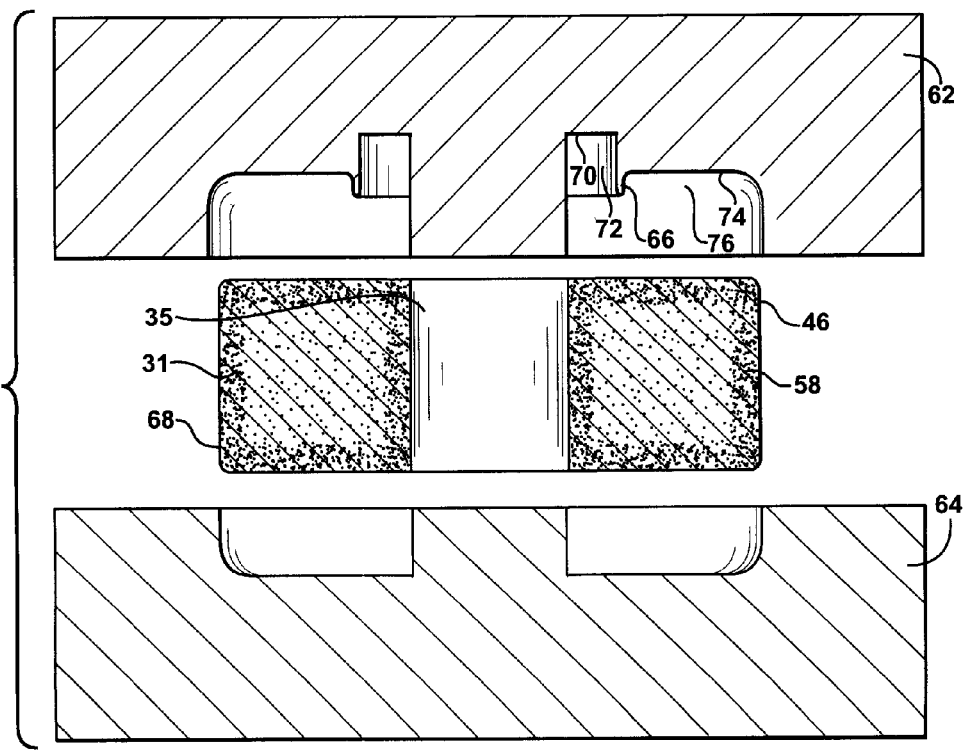

INSULATOR FOR A WHEEL SUSPENSION SYSTEM

CROSS-REFERENCE TO RELATED APPLICATIONS

The subject patent application claims priority to and all the benefits of U.S. Provisional Patent Application Ser. No. 60/807,518 which was filed on Jul. 17, 2006 and U.S. Provisional Patent Application Ser. No. 60/824,976 which was filed on Sep. 8, 2006, the entire specifications of both of which are expressly incorporated herein by reference.

BACKGROUND OF THE INVENTION

1. Field of the Invention

The present invention relates to an insulator of varying density for a wheel suspension system. The present invention further includes a method of deforming the insulator to densify and to shape a portion of the insulator.

2. Description of the Related Art

A wheel suspension system for a vehicle includes a support structure having an aperture and adapted to be mounted to the vehicle. A piston rod of a damper tube or shock absorber is at least partially disposed within the aperture and is displaceable relative to the support structure along a line of travel. A plate is mounted to the piston rod and moves relative to the support structure during the displacement of the piston rod. An insulator is compressibly disposed between the support structure and the plate.

The insulator is formed of an elastomeric material of a first density and presents an exterior surface adjacent at least one of the support structure and the plate. When the piston rod is displaced along the line of travel, the support structure and the plate move relative to each other to load and unload force to the insulator. The insulator compresses and decompresses between the plate and the support structure to absorb loads and vibration between the plate and the support structure. The insulator has a tendency to become cracked and/or cut as the insulator is repeatedly loaded and unloaded because the force delivered by the support structure and the plate to the insulator causes localized stress, i.e., concentrated stress, on the exterior surface of the insulator. The cracks and/or cuts propagate with repeated loading and unloading of the insulator. The cracks and/or cuts degrade the vibration dampening characteristics of the insulator and degrades the durability and reliability of the insulator.

U.S. Pat. No. 6,592,112 to Bishop et al. (the '112 patent) discloses a channel defined by the exterior surface and extending into the elastomeric material for reducing the cracking and cutting of the insulator by the support structure and the plate. The insulator deforms when the support structure and the plate exert a compressive force on the insulator. The channel allows the insulator to deform in a manner such that the localized stress on the exterior surface of the insulator is distributed along the exterior surface. Because the channel reduces the cracking and/or cutting of the insulator, the channel increases the durability and reliability of the insulator. However, as the support structure and the plate exert a compressive force on the insulator, the insulator flexes about the channel and cracks at a bottom of the channel. Although the channel reduces cracking, a further reduction or elimination of cracking would advantageously increase the durability and reliability of the insulator.

One way to decrease the flexibility of the insulator about the channel is to increase the density of the insulator. The density of the elastomeric material is increased for decreasing the flexibility of the insulator about the channel such that the flexing of the insulator about the channel is limited and to strengthen the material about the channel to reduce cracking at the bottom of the channel. However, increasing the density of the elastomeric material of the insulator disadvantageously limits the ability of the insulator to absorb loads and vibrations between the support structure and the plate. In other words, the density of the entire insulator is increased, which limits the cracking about the channel but which also disadvantageously reduces the load and vibration absorption capabilities of the insulator.

Accordingly, it would be desirable to manufacture an insulator for a wheel suspension system that is resistant to cracking and/or cutting of the insulator caused by the support structure and/or the plate while still maintaining desirable load and vibration absorption capabilities. Likewise, it would be desirable to identify a method of forming the insulator with such characteristics.

SUMMARY OF THE INVENTION AND ADVANTAGES

The present invention is an insulator for a wheel suspension system of a vehicle. The suspension system includes a support structure adapted to be mounted to the vehicle, a piston rod disposed within the aperture and displaceable relative to the support structure along a line of travel, and a plate mounted to the piston rod. The insulator includes elastomeric material of a first density for compressible disposition between the support structure and the plate. The insulator presents an exterior surface for disposition adjacent at least one of the support structure and the plate. The exterior surface defines a channel extending into the elastomeric material for increasing the flexibility of the insulator when the support structure and the plate exert a compressive force on the insulator. The elastomeric material defines an increased density about the channel with the increased density greater than the first density for increasing the durability of the insulator about the channel when the support structure and the plate exert a compressive force on the insulator.

The present invention also includes a method of deforming an insulator with the use of a mold. The mold includes a first mold half having a protrusion. The method includes the steps of forming the insulator from a thermosetting, elastomeric microcellular polyurethane material and heating at least an exterior portion of the insulator to a first temperature. The method further includes the step of pressing the protrusion of the first mold half into the exterior portion of the insulator while maintaining the exterior portion of the insulator at the first temperature to simultaneously form a channel in the exterior portion of the insulator and permanently increase a density of the exterior portion of the insulator about the channel relative to a density of the remaining portions of the material.

Accordingly, the insulator has varying density such that the durability and reliability of the insulator is increased and the load and vibration absorption capability of the insulator is maintained. Specifically, the increased density about the channel limits the flexing of the insulator about the channel when the support structure and the plate exert compressive force on the insulator and the increased density strengthens the material about the channel. As such, the elastomeric material of the increased density reduces cracking about the channel to increase the durability and reliability of the insulator. In addition to the increased durability and reliability of the insulator, the insulator maintains load and vibration absorption capabilities because the elastomeric material of the first density advantageously absorbs loads and vibrations between the support structure and the plate.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is a cross-sectional view of the insulator depicting varying density within the insulator;

FIG. 6 is a cross-sectional side view of the insulator in said mold prior to deformation of the undeformed insulator.

DETAILED DESCRIPTION OF A PREFERRED EMBODIMENT OF THE INVENTION

Figure 1:
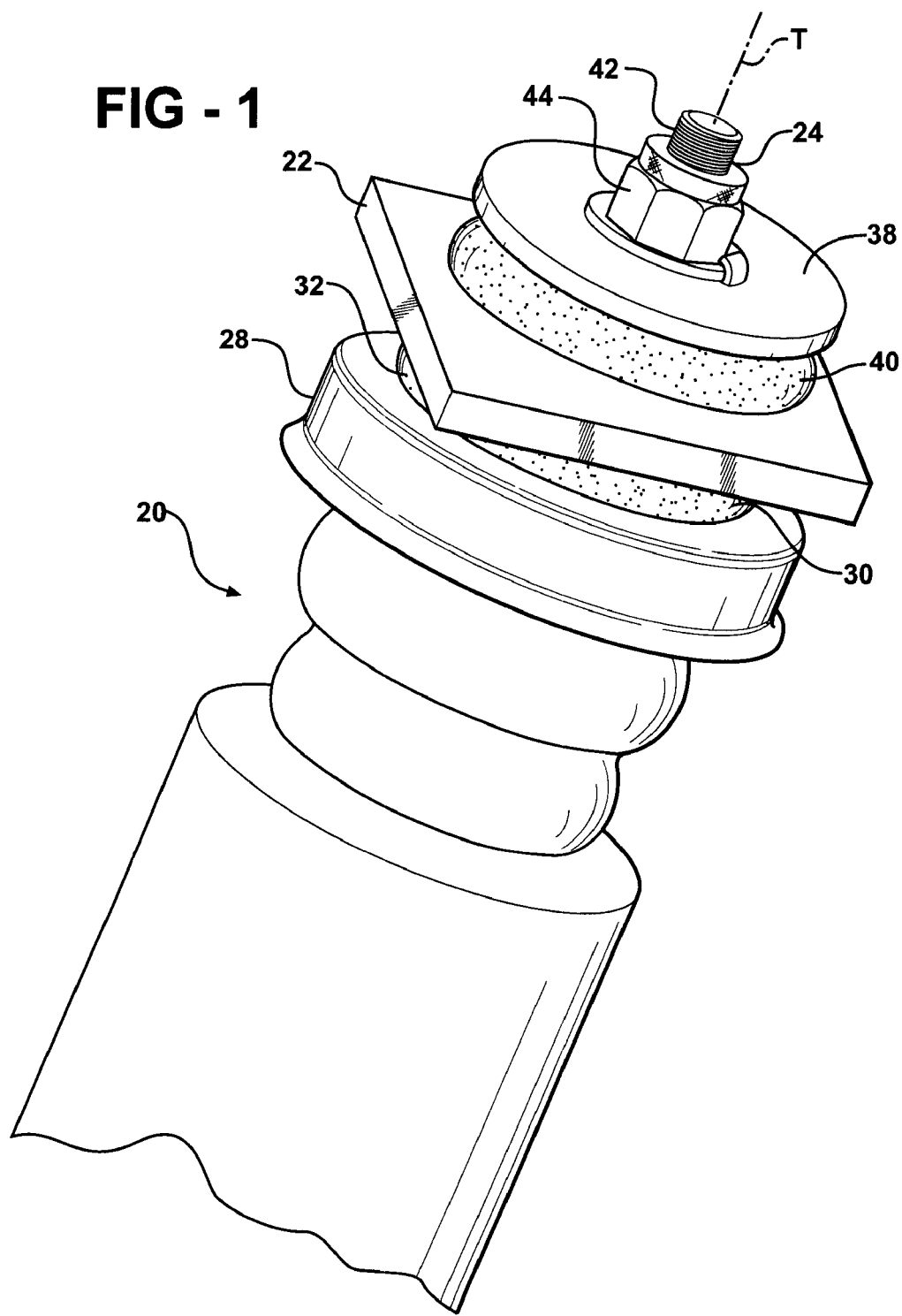
FIG. 1 is a perspective view of a portion of a wheel suspension system including an insulator.
Figure 2:
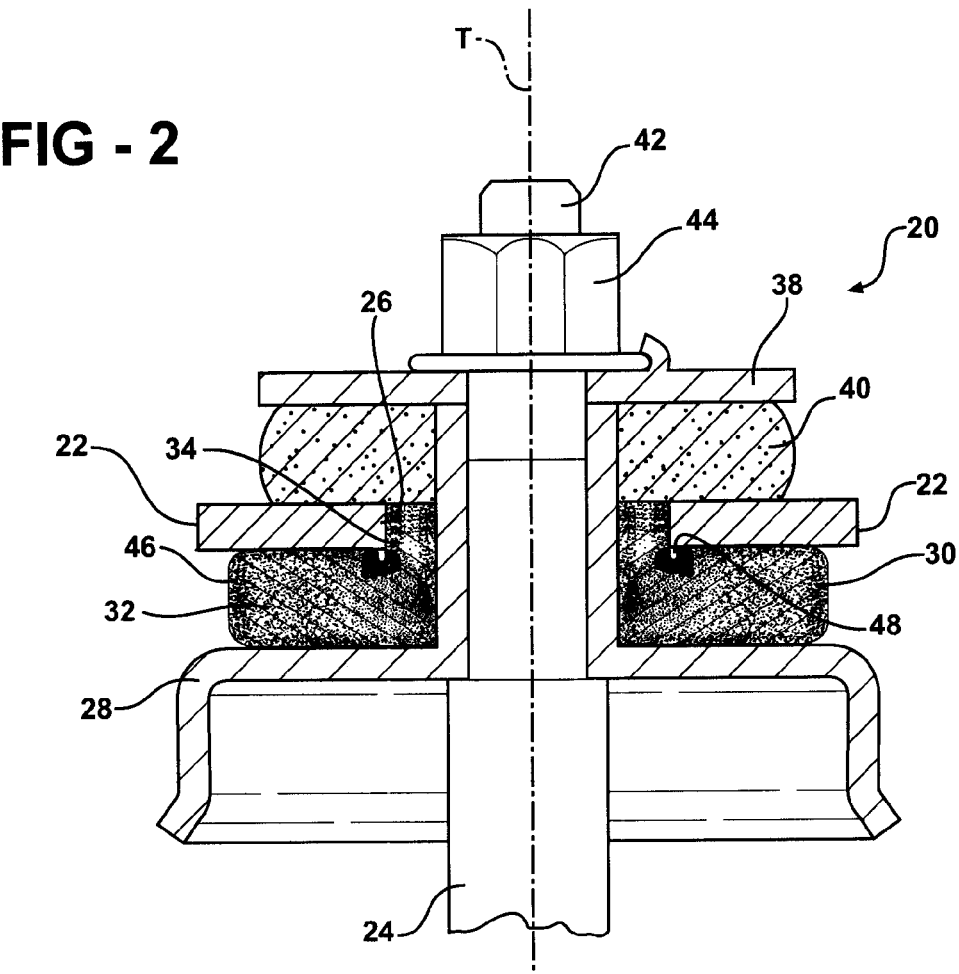
FIG. 2 is a cross-sectional view of a portion of the wheel suspension system.

Referring to the Figures, wherein like numerals indicate corresponding parts throughout the several views, a wheel suspension system 20 for a vehicle is generally shown in FIGS. 1 and 2. The wheel suspension system 20 includes a support structure 22 adapted to be mounted to the vehicle. The wheel suspension system 20 further includes a piston rod 24 and the support structure 22 defines an aperture 26 with the piston rod 24 at least partially disposed within the aperture 26. A plate 28 is mounted to the piston rod 24. The piston rod 24 is displaceable relative to the support structure 22 along a line of travel T and the plate 28 moves relative to the support structure 22 during the displacement of the piston rod 24, i.e., the plate 28 is fixed to and moves with the piston rod 24. As appreciated by one skilled in the art, for example the piston rod 24 is displaced along the line of travel T when the vehicle travels over an uneven driving surface.

An insulator 30 is compressibly disposed between the support structure 22 and the plate 28. Specifically, the insulator 30 is formed of an elastomeric material of a first density. The insulator 30 absorbs loads and vibration between the support structure 22 and the plate 28 when the piston rod 24 is displaced along the line of travel T. In other words, movement of the support structure 22 relative to the piston rod 24 loads and unloads compressive forces to and from the insulator 30 and the insulator 30 absorbs such loads and dampens associated vibration.

Figure 3:
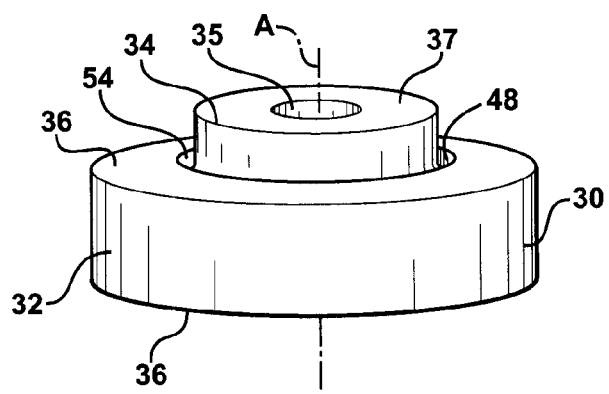
FIG. 3 is a perspective view of the insulator.

As best shown in FIGS. 3-4, the insulator 30 extends along an axis A and includes a base 32 and a shaft 34 extending from the base 32. Specifically, the base 32 extends along the axis A between a pair of ends 36 and the shaft 34 is smaller in diameter than the base 32 and extends from one of the ends 36 away from the base 32 along the axis A. As best shown in FIG. 3, the base 32 and the shaft 34 are cylindrical. The insulator 30 defines a bore 35 along the axis A and the insulator 30 receives the piston rod 24 in the bore 35.

As best shown in FIG. 2, the base 32 of the insulator 30 abuts the plate 28 and the shaft 34 of the insulator 30 extends into the aperture 26 of the support structure 22 between the support structure 22 and the piston rod 24. The base 32 absorbs axial loads when the piston rod 24 is displaced along the line of travel T, i.e., along the axis A. The shaft 34 absorbs lateral loads relative to the axis A that the piston rod 24 and support structure 22 exert on the shaft 34.

The wheel suspension system 20 further includes a second plate 38 spaced from the first plate 28 with the insulator 30 and support structure 22 disposed between the plate 28 and the second plate 38. A second insulator 40 is disposed between the support structure 22 and the second plate 38. The second insulator 40 is disc-shaped and, as shown in FIG. 2, is spaced from the shaft 34 of the insulator 30. It should be appreciated that the second insulator 40 may be any shape without departing from the nature of the present invention and for example could be the same shape as the insulator 30.

As best shown in FIG. 2, the piston rod 24 extends through each of the plate 28, the insulator 30, the second insulator 40, and the second plate 38. The rod presents a threaded end 42 and a threaded fastener 44, e.g., a nut, is threadedly engaged with the threaded end 42 to retain the insulator 30, the second insulator 40, and the support structure 22 between the plate 28 and the second plate 38.

The insulator 30 presents an exterior surface 46 adjacent at least one of the support structure 22 and the plate 28. As shown in FIGS. 1-2, the exterior surface 46 is adjacent both the support structure 22 and the plate 28. Specifically, the exterior surface 46 abuts the support structure 22 and the plate 28 and the base 32 extends between the support structure 22 and the plate 28.

As best shown in FIGS. 3-4, the exterior surface 46 defines a channel 48 extending into the elastomeric material. As best shown in FIG. 4, the elastomeric material defines a first portion 50, a second portion 52, and an intermediate portion 53 disposed between the first and second portions 50, 52. As will be discussed below, and as shown in FIGS. 3-4, the first portion 50 defines the first density, the second portion 52 defines a second density less than the first density, and the intermediate portion 53 defines an intermediate density transitioning from the first density to the second density. The channel 48 is disposed between the first and second portions 50, 52. The first portion 50 extends along the axis A between the pair of ends 36 of the base 32. The second portion 52 extends beyond one of the pair of ends 36 to define the shaft 34. The shaft 34 extends from one of the pair of ends 36 to a distal end 37 spaced from the base 32. The shaft 34 is smaller in diameter than the first portion 50 and extends from one of the pair of ends 36 of the first portion 50 along the axis A.

As shown in FIG. 4, the base is defined by the first portion 50, the intermediate portion 53, and part of the second portion 52. The shaft 34 is defined by part of the second portion 52. The channel 48 is defined by the base 32 adjacent the shaft 34. Specifically, the base 32 and the shaft 34 define a corner 54 therebetween and the channel 48 is defined along the corner 54 circumferentially around the shaft 34. The channel 48 is shallow relative to the base 32.

As best shown in FIG. 2, the support structure 22 is disposed along the corner 54. With insulators of the prior art that do not include the channel along the corner, the support structure exerts localized stress, i.e., concentrated stress, along the corner and the localized stress cracks and cuts the insulator along the corner. Specifically, the base tends to crack or to be cut at the intersection of the base and the shaft. As the support structure loads and unloads compressive forces to and from the base, the support structure compresses and decompresses the base. Repeated loading and unloading of force on the base cracks and/or cuts the exterior surface of the base. The cracks and cuts propagate with repeated loading and unloading. The cracks and cuts degrade the vibration dampening characteristics of the insulator and degrade the durability of the insulator.

With the insulator 30 of the present invention, the channel 48 increases the flexibility of the insulator 30 when the support structure 22 and the plate 28 exert a compressive force on the insulator 30, i.e., when the piston rod 24 is displaced along the line of travel T. The channel 48 increases the flexibility between the first and second portions 50, 52 when the support structure 22 and the plate 28 exert a compressive force on at least one of the first and second portions 50, 52. Specifically, the channel 48 allows the insulator 30 to deform in a manner such that the localized stress exerted by the support structure 22 on the insulator 30 is distributed along the exterior surface 46 of the insulator 30. Specifically, the channel 48 increases the flexibility of the shaft 34 and the base 32 relative to each other.

The elastomeric material defines an increased density about the channel 48. The increased density is greater than the first density for increasing the durability of the insulator 30 about the channel 48 when the support structure 22 and the plate 28 exert a compressive force on the insulator 30. With insulators of the prior art that include the channel, the insulator flexes about the channel resulting in cracking at a bottom of the channel. The cracks propagate with repeated loading and unloading. The cracks degrade the vibration dampening characteristics of the insulator and degrade the durability of the insulator.

With the insulator 30 of the present invention, the increased density about the channel 48 strengthens the elastomeric material about the channel 48. The increased density increases the rigidity of the channel 48 to prevent overextension of the first portion 50 relative to the second portion 52 when the plate 28 and the support structure 22 exert compressive forces on the insulator 30. The increased density also strengthens the material about the channel. As such, the increased density prevents cracking to maintain the vibration dampening characteristics of the insulator 30 and to increase the durability and reliability of the insulator 30.

In other words, the insulator 30 has varying density such that the durability and reliability of the insulator 30 is increased and the load and vibration absorption capability of the insulator 30 is maintained. Specifically, the increased density about the channel 48 limits the flexing of the insulator 30 about the channel 48 and strengthens the material about the channel 48 and the elastomeric material of the first density advantageously absorbs loads and vibrations between the support structure 22 and the plate 28.

The location of the channel 48 along the exterior surface 46 is a factor in the design of the insulator 30 such that the insulator 30 has satisfactory vibration dampening characteristics. In other words, because the exterior surface 46 will not be cracked and/or cut and because the channel 48 is a design factor, the insulator 30 is formed with and maintains satisfactory vibration dampening characteristics. It should be appreciated that the exterior surface 46 may define a plurality of channels 48 as required to reduce cracking and to achieve appropriate vibration dampening characteristics of the insulator 30.

The second portion 52 defines the second density different than the first density and the increased density. Specifically, the second density is less than the first density and less than the increased density. The shaft 34 absorbs lateral loads relative to the axis A and the base 32 absorbs axial loads along the axis A. As such, the first density of the first portion 50, i.e., in the base 32, may be optimized to absorb axial loads and vibrations and the second density of the second portion 52, i.e., in the shaft, may be optimized to absorb lateral loads and vibrations.

As shown in FIG. 4, the intermediate portion 53 defines the intermediate density transitioning between the first density and the increased density. The intermediate density also transitions between the first density and the second density and between the increased density and the second density. For example, the first density is between 300 Kg/m$^3$ and 800 Kg/m$^3$, the increased density is between 450 Kg/m$^3$ and 1050 Kg/m$^3$, and the second density is between 200 Kg/m$^3$ and 700 Kg/m$^3$.

The insulator 30 is formed of microcellular polyurethane (MCU). Specifically, the insulator 30 is integrally formed of a common homogeneous MCU material. In other words, the first and second portions 50, 52 are integral with each other, i.e., formed as a one-piece component formed of MCU and having varying density within the insulator 30.

For example, the MCU is of the type manufactured by BASF Corporation under the tradename Cellasto®. The MCU is a thermosetting material. In other words, once the MCU is formed and cured, the MCU is not meltable without permanently altering the chemical bonds and the physical properties of the MCU. Specifically, thermosetting material is defined by molecules that chemically bond with each other when heated. Thermosetting materials cannot melt without degrading because the melt temperature is higher than the chemical degradation temperature. More specifically, molecules of the thermosetting material cross-link with each other to create a permanent three-dimensional molecular network.

The MCU is formed from a two-step process. In the first step of the process, an isocyanate prepolymer is formed by reacting a polyol and an isocyanate. The polyol is polyester, and alternatively is polyether. The isocyanate is monomeric methyldiphenyl diisocyanate, and alternatively is naphthalene diisocyanate. In the second step of the process, the isocyanate prepolymer reacts with water to generate carbon dioxide and the carbon dioxide forms the cells of the MCU.

For example, polyester polyols are produced from the reaction of a dicarboxylic acid and a glycol having at least one primary hydroxyl group. For example, dicarboxylic acids that are suitable for producing the polyester polyols are selected from the group of, but are not limited to, adipic acid, methyl adipic acid, succinic acid, suberic acid, sebacic acid, oxalic acid, glutaric acid, pimelic acid, azelaic acid, phthalic acid, terephthalic acid, isophthalic acid, and combinations thereof. For example, glycols that are suitable for producing the polyester polyols are selected from the group of, but are not limited to, ethylene glycol, butylene glycol, hexanediol, bis (hydroxymethylcyclohexane), 1,4-butanediol, diethylene glycol, 2,2-dimethyl propylene glycol, 1,3-propylene glycol, and combinations thereof. The polyester polyol has a hydroxyl number of from 30 to 130, a nominal functionality of from 1.9 to 2.3, and a nominal molecular weight of from 1000 to 3000. Specific examples of polyester polyols suitable for the subject invention include Pluracol® Series commercially available from BASF Corporation of Florham Park, N.J.

For example, polyether polyols are produced from the cyclic ether propylene oxide, and alternatively ethylene oxide or tetrahydrofuran. Propylene oxide is added to an initiator in the presence of a catalyst to produce the polyester polyol. Polyether polyols are selected from the group of, but are not limited to, polytetramethylene glycol, polyethylene glycol, polypropylene glycol, and combinations thereof. The polyether polyol has a hydroxyl number of from 30 to 130, a nominal functionality of from 1.8 to 2.3, and a nominal molecular weight of from 1000 to 5000. Specific examples of polyether polyols suitable for the subject invention include Pluracol® 858, Pluracol® 538, Pluracol® 220, Pluracol® TP Series, Pluracol® GP Series, and Pluracol® P Series commercially available from BASF Corporation of Florham Park, N.J.

For example, diisocyanates are selected from the group of, but are not limited to, 4,4'-diphenylmethane diisocyanate, 2,4'-diphenylmethane diisocyanate, ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate, and combinations thereof. Specific examples of diisocyanates suitable for the subject invention include Lupranate® 5143, Lupranate® MM103, and Lupranate® R2500U commercially available from BASF Corporation of Florham Park, N.J.

The monomeric methyldiphenyl diisocyanate is selected from the group of 4,4'-diphenylmethane diisocyanate, 2,4'-diphenylmethane diisocyanate, and combinations thereof. Specific examples of monomeric methyldiphenyl diisocyanates suitable for the subject invention include Lupranate® M and Lupranate® MS commercially available from BASF Corporation of Florham Park, N.J. The monomeric methyldiphenyl diisocyante may also be modified with carbonimide. Specific examples of carbonimide-modified monomeric methyldiphenyl diisocyante include Lupranate® 5143 and Lupranate® MM103 commercially available from BASF Corporation of Florham Park, N.J.

The insulator 30 includes a skin 58 continuous with and surrounding the insulator 30. Specifically, the skin 58 results from the forming process of the MCU, i.e., when the isocyanate prepolymer reacts with water. The skin 58 increases resistance to slicing, abrasion, and wear. It should be appreciated that prior to deformation, the insulator 30 has uniform density throughout the mount insulator 30 other than the skin 58. Alternatively, prior to deformation, mount insulator 30 has varying density throughout the mount insulator 30 in addition to the skin 58.

The present invention further includes a method of deforming the insulator 30. The method of deforming the insulator 30 formed from MCU enables strategic densification and shaping of the MCU about the channel 48 and at the second portion 52 and the densification is manageable as design of the insulator 30 requires.

As known to one skilled in the art, MCU has a microcellular structure. In other words, the MCU presents cell walls defining cells, or void space. When not subject to compressive forces, the cell walls have an original shape and the cells are generally filled with air. When the insulator 30 made of MCU is subjected to compressive forces, the cell walls are collapsed and air evacuates from the cells and the insulator 30 is thereby deformed. When the compressive forces are removed from the insulator 30 the cell walls return to the original shape and the insulator 30 thereby regains its form. The method of the present invention permanently deforms, or collapses, the cell walls of the MCU about the channel 48 thereby permanently shaping the channel 48 and permanently increasing the density about the channel 48. Likewise, the method permanently deforms, or collapses, the cell walls of the MCU of the second portion 52 thereby permanently shaping the second portion 52 and permanently increasing the density of the second portion 52. As referred to herein, the density of the insulator 30 is the weight of the insulator 30 divided by the volume of the insulator 30. In other words, it should be appreciated that the density of the chemical, i.e., the MCU, is not being altered, but instead the density of the insulator 30 is being altered.

The method includes the steps of forming the insulator 30 from thermosetting, elastomeric MCU material. Specifically, the step of forming the insulator 30 is further defined as forming a pre-deformation insulator 31 made of MCU. The term "pre-deformation insulator 31" is used to refer to the insulator 30 before the method of the present invention deforms and densifies the MCU. The pre-deformation insulator 31 is generally cylindrical in shape. However, it should be appreciated that the pre-deformation insulator 31 may have any shape without departing from the nature of the present invention.

The step of forming the insulator 30 is further defined as forming the pre-deformation insulator 31 made of MCU from a liquid reaction mixture to a partially cured state before all chemical reactions of the MCU are complete. In other words, the pre-deformation insulator 31 is formed in a partially cured state such that the pre-deformation insulator 31 is deformed while the MCU is in the partially cured state. The partially cured state is also known in the art as a gelled state. Alternatively, the pre-deformation insulator 31 is deformed while the MCU is in the fully cured state.

The thermosetting, elastomeric MCU is formed from reacting a polyol and an isocyanate, wherein the polyol is polyester and the isocyanate is monomeric methyldiphenyl diisocyanate. More specifically, as known to one skilled in the art, generally the pre-deformation insulator 31 made of MCU is formed by mixing and injecting the liquid reaction mixture into a reaction mold 60. The liquid reaction mixture reacts and solidifies such that the pre-deformation insulator 31 is in the partially cured state. In the partially cured state, the MCU has the physical property of being solid and the bonds in the MCU are not completely formed. In the fully cured state, the bonds of the MCU are completely formed. Generally, heating the insulator 30 accelerates the complete formation of the bonds. In other words, the insulator 30 may be heated to cure the MCU.

The pre-deformation insulator 31 is formed having a pre-deformation density between 200 $Kg/m^3$ and 700 $Kg/m^3$. However, it should be appreciated that the method of the present invention may include MCU of any pre-deformation density. The pre-deformation insulator 31 is shown in FIG. 6.

Figure 5:
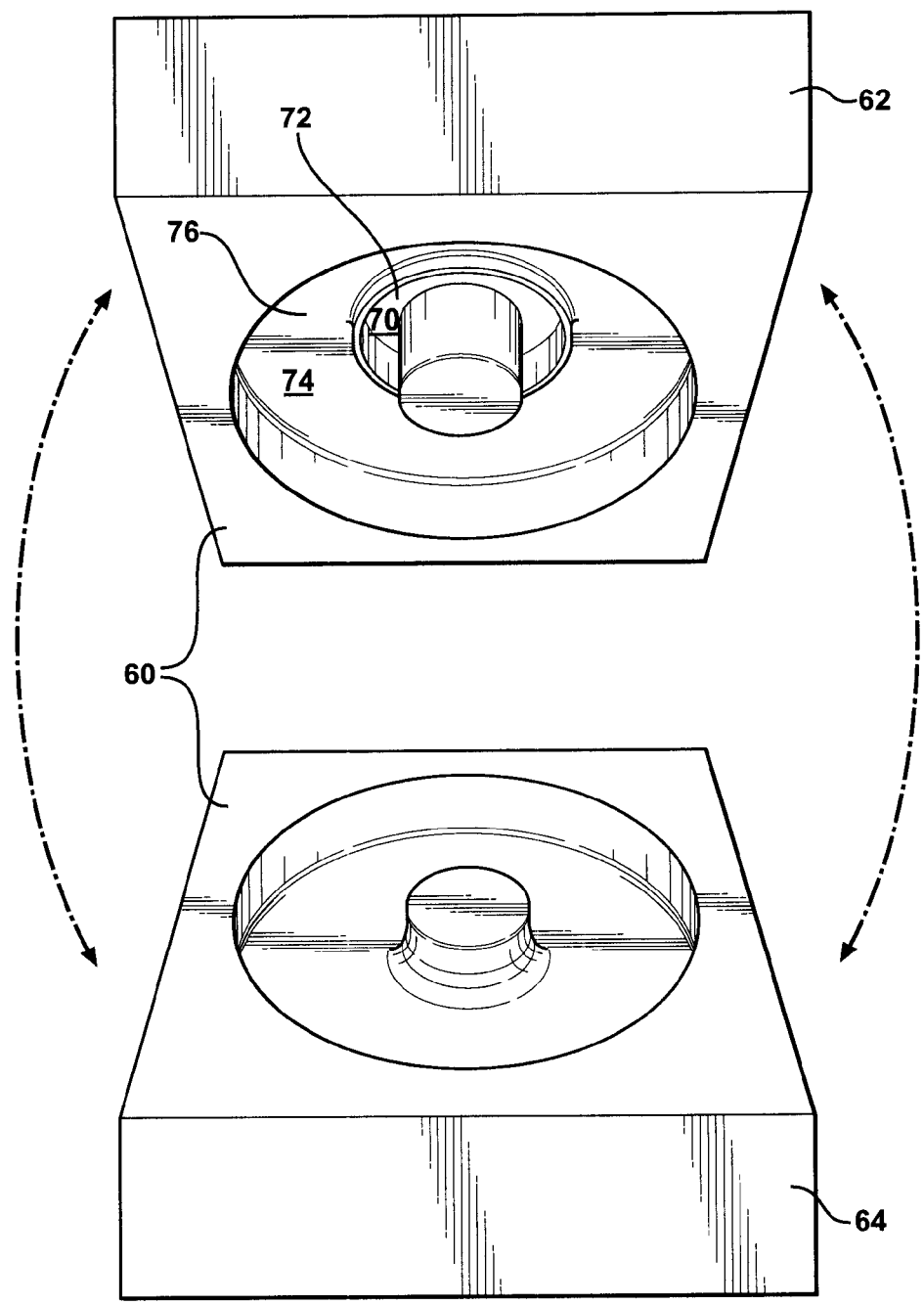
FIG. 5 is a perspective view of a mold used to deform an undeformed insulator.

The pre-deformation insulator 31 is deformed into the insulator 30 with the use of a mold 60 and a process generally known as thermoforming. As shown in FIGS. 5-6, the mold 60 includes a first mold half 62 and a second mold half 64. The first mold half 62 has a protrusion 66.

The method includes the step of heating at least an exterior portion 68 of the pre-deformation insulator 31 to a first temperature. Specifically, the step of heating the pre-deformation insulator 31 to the first temperature is further defined as heating the exterior portion 68 to between 145° C. and 235° C. and more preferably to between 175° C. and 205° C. The step of heating the pre-deformation insulator 31 causes the cell walls of the MCU to become impressionable such that the cell walls of the MCU may be permanently deformed. The exterior portion 68 is that portion of the insulator 30 that defines the increased density after deformation. As will be discussed below, the remainder of the pre-deformation insulator 31 in addition to the exterior portion 68 may be heated to the first temperature The method further includes placing the pre-deformation insulator 31 into the second mold half 64. The method further includes pressing the protrusion 66 of the first mold half 62 into the exterior portion 68 of the insulator 30 while maintaining the exterior portion 68 of the insulator 30 at the first temperature. Pressing the protrusion 66 into the exterior portion 68 simultaneously forms the channel 48 permanently in the exterior portion 68 of the insulator 30 and permanently increases a density of the exterior portion 68 of the insulator 30 about the channel 48 relative to a density of the remaining portions of the material. Specifically, the step of pressing the protrusion 68 into the exterior portion 68 increases the density of the exterior portion 68 to the increased density.

As best shown in FIG. 6, the first mold half 62 includes a first recessed surface 70 defining a short cavity 72 adjacent the protrusion 66 and a second recessed surface 74 defining a tall cavity 76 adjacent the protrusion 66 and spaced from the short cavity 72. The step of pressing the protrusion 66 is further defined as compressing the first portion 50 of the insulator 30 to permanently increase a density of the first portion 50 different than the densities of the second portion 52 and the exterior portion 68. Specifically, the method further includes the step of heating the first portion 50 to the first temperature and disposing the first portion 50 in the tall cavity 76 and compressing the first portion 50 with the first recessed surface 70 to simultaneously permanently deform the first portion 50 and permanently increase the density of the first portion 50. Specifically, the density of the first portion is increased to the first density.

The step of compressing the first portion pre-sets the MCU of the first portion 50. In other words, after several cycles of compression, MCU takes a set, i.e., the MCU does not fully expand to its original shape and the density of the MCU is permanently increased. Such setting is unpredictable and changes the load and vibration absorption characteristics of the MCU. When the MCU is pre-set, the MCU does not set as a result of compression cycles. As such, the pre-set first portion 50 does not set as a result of compression cycles and the load and vibration absorption characteristics of the first portion 50 are not changed by compression cycles.

The method further includes the step of disposing the second portion 52 of the insulator 30 in the tall cavity 72 while preventing compression of the second portion 52 by the second recessed surface 74 to maintain the second portion 52 at an undeformed state. It should be appreciated that the undeformed state is such that the first portion 50 is not permanently deformed. For example, the undeformed state is achieved by maintaining the first portion 50 in an uncompressed state such that the first density of the first portion 50 is not permanently increased. In the alternative or in addition, the undeformed state is achieved by maintaining the first portion 50 below the first temperature such that the first density of the first portion 50 is not permanently increased. As such, the method of the present invention does not alter the density of the second portion 52 and the density of the second portion is the second density after the steps of the present invention are performed. Specifically, because the density of the second portion is not altered, the density of the second portion is the pre-deformation density.

The step of heating the insulator 30 is further defined as heating the first mold half 62 and the second mold half 64 while the pre-deformation insulator 31 is disposed between the first and second mold halves 62, 64. Preferably, the step of heating the first and second mold halves 62, 64 is further defined as heating the mold halves to between to between 175° C. and 260° C., and more preferably to between 205° C. and 235° C. Heat is conductively transferred from the first and second mold halves 62, 64 to the pre-deformation insulator 31 when the pre-deformation insulator 31 is disposed between the first and second mold halves 62, 64 and while the first and second mold halves 62, 64 are heated. The conductive heat transfer increases the temperature of the insulator 30 to the first temperature such that the cell walls of the MCU are impressionable.

Alternatively or in addition to conductively heating with the first and second mold halves 62, 64, the pre-deformation insulator 31 may be heated prior to the disposition onto the second mold half 64. For example, the pre-deformation insulator 31 may be heated with infrared heat, microwave heat, or by convection prior to disposition of the pre-deformation insulator 31 onto the second mold half 64. When heated prior to disposition onto the second mold half 64, the pre-deformation insulator 31 is heated to the first temperature such that heat transfer from the first and second mold halves 62, 64 maintains the pre-deformation insulator 31 at the first temperature. Alternatively, the pre-deformation insulator 31 is heated to a temperature below the first temperature such that less heat transfer is required from the first and second mold halves 62, 64 to raise the temperature of the pre-deformation insulator 30 to the first temperature.

The method of the present invention is advantageously applied to the insulator 30 due to the relative thinness and the relatively complex shape of the insulator 30. Difficulties arise with the current methods of forming MCU components when the component is thin. Difficulties also arise when the component defines sharp angles. The method of the present invention solves this problem by forming the insulator in a shape that is easily formed using current methods and subsequently deforming the insulator to shape the insulator.

Specifically, the method may include the step of forming a cylindrical bar of MCU and subsequently cutting the bar into a plurality of pre-deformation insulators 31. Each of the pre-deformation insulators 31 is then deformed using the method described above. Specifically, achieving accurate tolerances when molding relatively small components of MCU is difficult. As such, forming the cylindrical bar of MCU and subsequently cutting the cylindrical bar results in more accurate tolerances for the insulator.

The method further includes the step of curing the MCU from the partially cured state to a fully cured state after the exterior portion 68 of the insulator 30 is compressed. The step of curing the MCU is further defined as heating the insulator 30 to between 105° C. and 115° C. for between 14 hours and 18 hours to complete the chemical reactions of the MCU. As previously discussed, in the partially cured state the chemical bonds in the MCU are not completely formed. Heating the MCU in the partially cured state accelerates the complete formation of the chemical bonds.

The method of the present invention is advantageous in that the method results in cost savings. Specifically, the insulator is formed from a low density pour. Such a low density pour results in material savings and consequently cost savings in comparison to high density pours. In other words, instead of using a high density pour to create an insulator having a uniform high density, the method of the present invention allows for a low density pour and strategic densification of selected portions of the insulator 30 that are to have higher densities.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A wheel suspension system for a vehicle, said wheel suspension system comprising:
   a support structure having an aperture and adapted to be mounted to the vehicle;
   a piston rod at least partially disposed within said aperture and displaceable relative to said support structure along a line of travel;
   a plate mounted to said piston rod and moving relative to said support structure during said displacement of said piston rod; and
   an insulator compressibly disposed between said support structure and said plate with said insulator formed of an elastomeric material and presenting an exterior surface adjacent at least one of said support structure and said plate with said exterior surface defining a channel extending into said elastomeric material;
   said elastomeric material defining a first portion defining a first density;
   said elastomeric material defining an increased density about said channel with said increased density greater than said first density;
   wherein said elastomeric material defines an intermediate density transitioning between said first density and said increased density.

2. The wheel suspension system as set forth in claim 1 wherein said first density is between 300 Kg/m$^3$ and 800 Kg/m$^3$ and wherein said increased density is between 450 Kg/m$^3$ and 1050 Kg/m$^3$.

3. The wheel suspension system as set forth in claim 1 wherein said elastomeric material defines a second portion with said channel disposed between said first and second portions.

4. The wheel suspension system as set forth in claim 3 wherein said second portion defines a second density different than said first density and said increased density.

5. The wheel suspension system as set forth in claim 4 wherein said second density is between 200 Kg/m$^3$ and 700 Kg/m$^3$.

6. The wheel suspension system as set forth in claim 3 wherein said insulator defines a base extending along an axis between a pair of ends and said second portion of said insulator defines a shaft smaller in diameter than said base extending from one of said ends of said first portion along said axis.

7. The wheel suspension system as set forth in claim 6 wherein said shaft and said base define a corner therebetween and wherein said channel is defined along said corner circumferentially around said shaft.

8. The wheel suspension system as set forth in claim 7 wherein said shaft extends into said aperture of said support structure between said support structure and said piston rod with said support structure abutting said exterior surface.

9. The wheel suspension system as set forth in claim 1 wherein said insulator is formed of microcellular polyurethane.

10. An insulator for a suspension system of a vehicle with the suspension system including a support structure adapted to be mounted to the vehicle, a piston rod disposed within an aperture of the support structure and displaceable relative to the support structure along a line of travel, and a plate mounted to the piston rod, said insulator comprising:
    elastomeric material compressibly disposed between the support structure and the plate;
    an exterior surface disposed adjacent at least one of said support structure and said plate with said exterior surface defining a channel extending into said elastomeric material;
    said elastomeric material defining a first portion defining a first density;
    said elastomeric material defining an increased density about said channel with said increased density greater than said first density;
    wherein said elastomeric material defines an intermediate density transitioning between said first density and said increased density.

11. The insulator as set forth in claim 10 wherein said first density is between 300 Kg/m$^3$ and 800 Kg/m$^3$ and wherein said increased density is between 450 Kg/m$^3$ and 1050 Kg/m$^3$.

12. The insulator as set forth in claim 10 wherein said elastomeric material defines a second portion with said channel disposed between said first and second portions.

13. The insulator as set forth in claim 12 wherein said second portion defines a second density different than said first density and said increased density.

14. The insulator as set forth in claim 13 wherein said second density is between 200 Kg/m$^3$ and 700 Kg/m$^3$.

15. The insulator as set forth in claim 12 wherein said insulator defines a base extending along an axis between a pair of ends and said second portion of said insulator defining a shaft smaller in diameter than said first portion extending from one of said ends of said base along said axis.

16. The insulator as set forth in claim 15 wherein said shaft and said base define a corner therebetween and wherein said channel is defined along said corner circumferentially around said shaft.

17. The insulator as set forth in claim 16 wherein said shaft extends into said aperture of said support structure between said support structure and said piston rod with said support structure abutting said exterior surface.

18. The insulator as set forth in claim 10 wherein said elastomeric material is further defined as microcellular polyurethane.

19. A wheel suspension system for a vehicle, said wheel suspension system comprising:
    a support structure having an aperture and adapted to be mounted to the vehicle;
    a piston rod at least partially disposed within said aperture and displaceable relative to said support structure along a line of travel;
    a plate mounted to said piston rod and moving relative to said support structure during said displacement of said piston rod; and
    an insulator compressibly disposed between said support structure and said plate with said insulator formed of an elastomeric material of a first density and presenting an exterior surface adjacent at least one of said support structure and said plate with said exterior surface defining a channel extending into said elastomeric material;
    said elastomeric material defining an increased density about said channel with said increased density greater than said first density;
    wherein said elastomeric material defines a first portion and a second portion with said channel disposed between said first and second portions; and
    wherein said first portion defines said first density and wherein said second portion defines a second density different than said first density and said increased density.

20. The wheel suspension system as set forth in claim 19 wherein said insulator defines a base extending along an axis between a pair of ends and said second portion of said insulator defines a shaft smaller in diameter than said base extending from one of said ends of said first portion along said axis.

21. The wheel suspension system as set forth in claim 20 wherein said shaft and said base define a corner therebetween and wherein said channel is defined along said corner circumferentially around said shaft.

22. The wheel suspension system as set forth in claim 19 wherein said insulator is formed of microcellular polyurethane.

23. An insulator for a suspension system of a vehicle with the suspension system including a support structure adapted to be mounted to the vehicle, a piston rod disposed within the aperture and displaceable relative to the support structure along a line of travel, and a plate mounted to the piston rod, said insulator comprising:

elastomeric material of a first density compressibly disposed between the support structure and the plate;

an exterior surface disposed adjacent at least one of said support structure and said plate with said exterior surface defining a channel extending into said elastomeric material;

said elastomeric material defining an increased density about said channel with said increased density greater than said first density;

wherein said elastomeric material defines a first portion and a second portion with said channel disposed between said first and second portions; and wherein said second portion defines a second density different than said first density and said increased density.

24. The insulator as set forth in claim 23 wherein said insulator defines a base extending along an axis between a pair of ends and said second portion of said insulator defining a shaft smaller in diameter than said first portion extending from one of said ends of said base along said axis.

25. The insulator as set forth in claim 24 wherein said shaft and said base define a corner therebetween and wherein said channel is defined along said corner circumferentially around said shaft.

26. The insulator as set forth in claim 23 wherein said elastomeric material is further defined as microcellular polyurethane.

27. A method of deforming an insulator utilizing a mold having a first mold half with a protrusion, said method comprising the steps of:

forming the insulator from a thermosetting, elastomeric microcellular polyurethane material having a first density for compressible disposition between a support structure and a plate of a suspension system of a vehicle, the support structure being adapted to be mounted to the vehicle and having an aperture with a piston rod at least partially disposed within the aperture and being displaceable relative to the support structure along a line of travel, the plate being mounted to the piston rod and moving relative to the support structure during displacement of the piston rod, said insulator presenting an exterior portion adjacent at least one of said support structure and said plate;

heating at least the exterior portion of the insulator to a first temperature, and pressing the protrusion of the first mold half into the exterior portion of the insulator while maintaining the exterior portion of the insulator at the first temperature to simultaneously form a channel in the exterior portion of the insulator and permanently increase a density of the exterior portion of the insulator about the channel to an increased density greater than the first density with an intermediate density transitioning between the increased density of the exterior portion and the first density of the first portion.

28. The method as set forth in claim 27 further including the step of compressing a first portion of the insulator to permanently increase a density of the first portion different than the density of the exterior portion.

29. The method as set forth in claim 28 wherein the first mold half includes a first recessed surface defining a short cavity adjacent the protrusion and wherein the step of pressing the protrusion is further defined as disposing the first portion in the short cavity and compressing the first portion with the first recessed surface to simultaneously deform the first portion and permanently increase the density of the first portion.

30. The method as set forth in claim 29 further including the step of heating the first portion to the first temperature before compressing the first portion with the first recessed surface.

31. The method as set forth in claim 29 wherein the first mold half includes a second recessed surface defining a tall cavity adjacent the protrusion and spaced from the short cavity and wherein the step of pressing the protrusion is further defined as disposing a second portion of the insulator in the tall cavity while preventing compression of the second portion by the second recessed surface to maintain the second portion at an undeformed state.

32. The method as set forth in claim 27 wherein the step of forming the insulator is further defined as forming the insulator made of microcellular polyurethane from a liquid reaction mixture to a partially cured state before all chemical reactions of the microcellular polyurethane are complete.

33. The method as set forth in claim 32 further including the step of curing the microcellular polyurethane from the partially cured state to a fully cured state after the exterior portion of the insulator is compressed.

34. The method as set forth in claim 27 wherein the step of forming the insulator is further defined as forming the insulator made of microcellular polyurethane having a pre-deformation density between 200 Kg/m$^3$ and 700 Kg/m$^3$.

35. The method as set forth in claim 27 wherein the thermosetting, elastomeric microcellular polyurethane is formed from reacting a polyol and an isocyanate, wherein the polyol is polyester and the isocyanate is monomeric methyldiphenyl diisocyanate.

36. The method as set forth in claim 27 wherein the step of heating the insulator to the first temperature is further defined as heating the insulator to between 145° C. and 235° C.

* * * * *